United States Patent
Hadi et al.

(10) Patent No.: US 10,215,010 B1
(45) Date of Patent: Feb. 26, 2019

(54) ANTI-WHIRL SYSTEMS AND METHODS

(71) Applicant: Nabors Drilling Technologies USA, Inc., Houston, TX (US)

(72) Inventors: Mahmoud Hadi, Richmond, TX (US); Brian Ellis, Spring, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 0 days.

(21) Appl. No.: 15/820,003

(22) Filed: Nov. 21, 2017

(51) Int. Cl.
| | | |
|---|---|---|
| *E21B 44/00* | (2006.01) | |
| *E21B 41/00* | (2006.01) | |
| *G05B 19/416* | (2006.01) | |
| *E21B 47/06* | (2012.01) | |

(52) U.S. Cl.
CPC .......... *E21B 44/00* (2013.01); *E21B 41/0092* (2013.01); *G05B 19/416* (2013.01); *E21B 47/06* (2013.01); *G05B 2219/39456* (2013.01)

(58) Field of Classification Search
CPC .... E21B 44/00; E21B 41/0092; G05B 19/416
See application file for complete search history.

(56) References Cited

U.S. PATENT DOCUMENTS

| | | | |
|---|---|---|---|
| 5,864,058 A | 1/1999 | Chen | |
| 2009/0114445 A1* | 5/2009 | Dashevskiy | E21B 44/00 175/45 |
| 2011/0174541 A1* | 7/2011 | Strachan | E21B 44/00 175/27 |
| 2014/0238662 A1* | 8/2014 | Prieto | F16F 15/005 166/244.1 |
| 2014/0251688 A1* | 9/2014 | Turner | G05B 13/048 175/45 |
| 2015/0083493 A1* | 3/2015 | Wassell | E21B 49/003 175/40 |
| 2015/0112488 A1* | 4/2015 | Hoehn | E21B 44/00 700/275 |
| 2015/0369031 A1* | 12/2015 | Yang | E21B 4/02 700/275 |
| 2017/0268324 A1* | 9/2017 | Moore | E21B 44/00 |
| 2017/0335671 A1* | 11/2017 | Dykstra | E21B 44/00 |
| 2018/0334897 A1* | 11/2018 | Samuel | E21B 44/00 |

OTHER PUBLICATIONS

U.S. Appl. No. 15/730,367, filed Oct. 11, 2017, Hadi, et al.

\* cited by examiner

*Primary Examiner* — Vincent H Tran
(74) *Attorney, Agent, or Firm* — Haynes and Boone, LLP

(57) ABSTRACT

Systems and methods for reducing or eliminating whirl are described. The system includes a controller and a drive system. The controller is configured to collect downhole information, determine a natural frequency of a drill string in the lateral motion, determine correlative relationships, model a forward whirl region, generate a control algorithm, determine a top drive supervisory setpoint, and provide operational control signals. The drive system is configured to receive the one or more operational control signals and limit the top drive RPM.

20 Claims, 5 Drawing Sheets

ANTI-WHIRL SYSTEMS AND METHODS

TECHNICAL FIELD

The present disclosure is directed to systems, devices, and methods for reducing whirl in a drilling rig. More specifically, the present disclosure is directed to systems, devices, and methods for scheduling the rotations per minute (RPM) or rotary speed of the top drive based on the weight on bit (WOB) sensed, e.g., to minimize or avoid forward whirl.

BACKGROUND OF THE DISCLOSURE

Bottom hole assembly (BHA) whirl and bit whirl are two types of downhole vibration that can severely damage drilling bits and downhole tools. "Whirl" is used to describe the rotational motion of a bit, BHA, or the drill string itself, in which the bit, for example, is rotating at a different rotational velocity with respect to the borehole wall than it would be rotating if the bit axis were stationary. This movement may be faster, or slower, than the case where the bit axis is stationary. In forward whirl, the drill string rotates clockwise, which is similar to the rotation of the bit on its axis. In backward whirl, the drill string rotates counter clockwise against the bit rotation axis.

When drilling a well and after a new connection is made, usually the driller will start up the mud pumps and rotate the top drive before the bit touches the bottom. The top drive will rotate to the RPM set point, which will rotate the BHA and bit. So far, there is not much load or weight put on the drill string. If the well is slightly deviated from vertical, that creates a mass imbalance and if the RPM set point is close to the lateral resonant frequency, then the BHA will start to forward whirl. After that, the driller will start to add weight and start drilling. Most of the time, forward whirl will disappear with the added weight. In severe situations where backward whirl is excited, the only way to mitigate the backward whirl is to pick up off bottom and completely stop rotating and then restart.

Efforts to reduce whirl have included modeling whirl vibrations, designing bits and the BHA to reduce whirl, detecting whirl using downhole sensors, and changing drilling parameters to reduce whirl. For example, when sensors indicate that vibration levels have exceeded some safe level, the WOB or RPM are adjusted.

Most of the solutions concentrate on designing drilling bits that reduce whirl and/or on BHA design by adding stabilizers in the right locations along the BHA that helps maintain stable rotation of the drill string relative to the wellbore. These physical solutions, however, are costly, and if they do not work, one has to wait until the next bit trip to make any modifications to the BHA or bit.

Thus, what are needed are systems, apparatuses, and methods that provide more effective ways to control forward whirl conditions.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
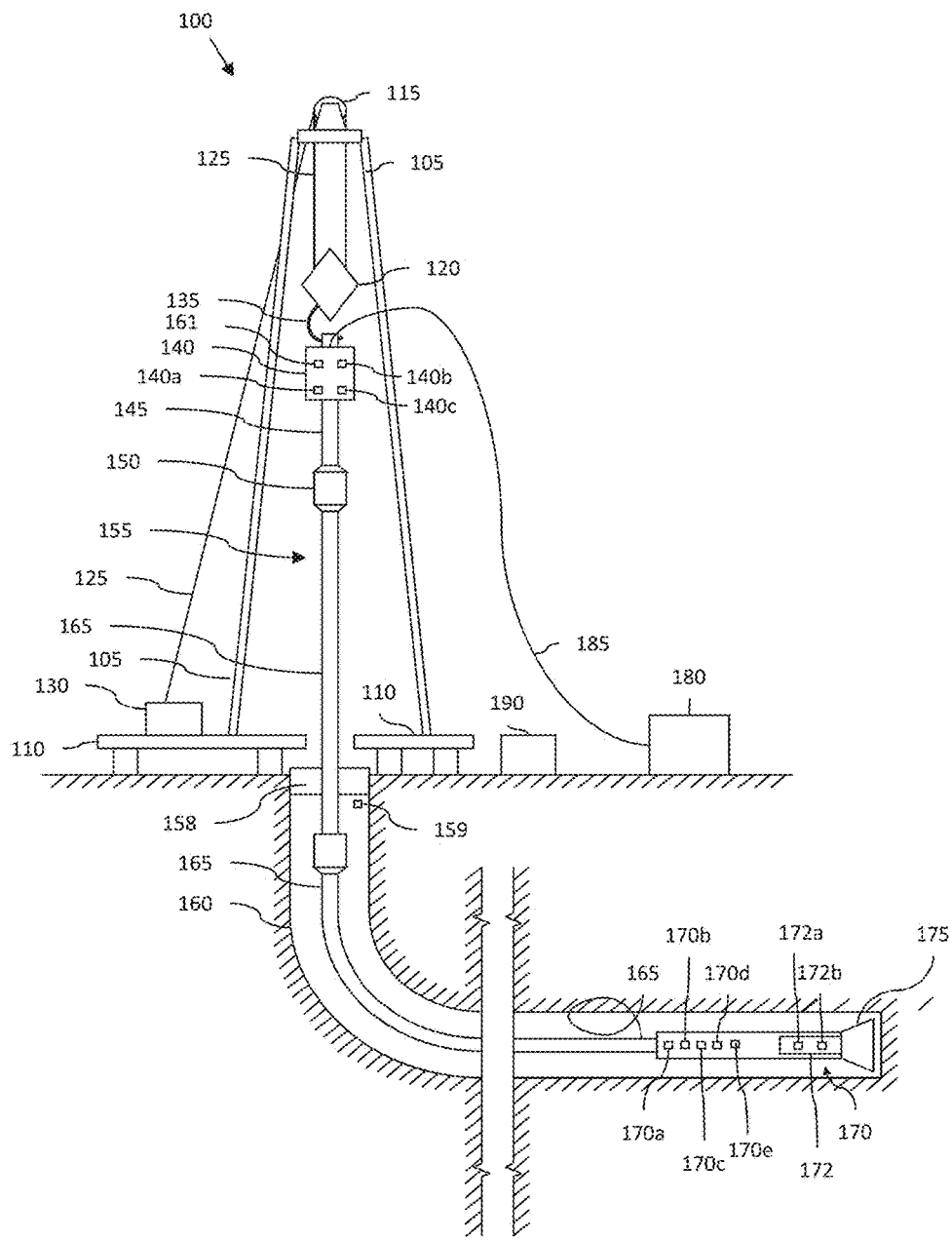
FIG. 1 is a diagram of an apparatus shown as an exemplary drilling rig according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure provides apparatuses, systems, and methods for reducing or mitigating whirl conditions based on a model formulated from downhole drilling parameters. For example, drilling parameters may include, but are not limited to, any of RPM, WOB, measured depth (MD), hole angle, hole diameter, characteristics of the drill bit and drill string, mud weight, mud flow rate, mud viscosity, rock properties, lithology of the formation, pore pressure of the formation, torque, pressure, temperature, rate of penetration, mechanical specific energy, and/or combinations thereof. Various parameters may be directly measured or must be indirectly measured, calculated, estimated, or otherwise inferred from available data. The devices, systems, and methods allow a user (alternately referred to herein as an "operator") to provide or change a drilling parameter that improves the drilling operation to reduce occurrences of both forward whirl and backward whirl.

Based on studies and data analysis on drilling data and downhole sensors, whirl is reduced by manipulating top drive RPM and WOB. The more downhole WOB sensed, the more RPM can be applied until the desired WOB-RPM is reached.

In various embodiments, one or more supervisory algorithms model regions of whirl (including regions of severe whirl) to predict the BHA response to possible changes in RPM and WOB. The supervisory algorithm(s) can then schedule the WOB and RPM values used in a drilling operation to avoid these whirl regions. The top drive RPM is determined based on the WOB.

Advantageously, the modeled whirl region(s) provide constraints that allow a driller or operator to operate in a safe environment (i.e., with little to no whirl). The WOB and RPM that generate the maximum ROP may be sought and communicated to the operator or autodriller. RPM and WOB are optimized to maximize ROP, but without inducing whirl.

By drilling or drill string, this term is generally also meant to include any tubular string. In one embodiment, the term drilling can include casing drilling, and drill string includes a casing string.

Referring to FIG. 1, illustrated is a schematic view of apparatus 100 demonstrating one or more aspects of the present disclosure. The apparatus 100 is or includes a land-based drilling rig. However, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

Apparatus 100 includes a mast 105 supporting lifting gear above a rig floor 110. The lifting gear includes a crown block 115 and a traveling block 120. The crown block 115 is coupled at or near the top of the mast 105, and the traveling block 120 hangs from the crown block 115 by a drilling line 125. The drilling line 125 extends from the lifting gear to drawworks 130, which is configured to reel out and reel in the drilling line 125 to cause the traveling block 120 to be lowered and raised relative to the rig floor 110.

A hook 135 is attached to the bottom of the traveling block 120. A top drive 140 is suspended from the hook 135. A quill 145 extending from the top drive 140 is attached to a saver sub 150, which is attached to a tubular string 155 suspended within a wellbore 160. Alternatively, the quill 145 may be attached to the tubular string 155 directly.

The tubular string 155 includes interconnected sections of tubular 165, a BHA 170, and a drill bit 175. The bottom hole assembly 170 may include stabilizers, drill collars, and/or measurement-while-drilling (MWD) or wireline conveyed instruments, among other components. The drill bit 175, which may also be referred to herein as a tool, is connected to the bottom of the BHA 170 or is otherwise attached to the tubular string 155. One or more pumps 180 may deliver fluid to the tubular string 155 through a conduit 185, which may be connected to the top drive 140. The conduit 185 includes a rig standpipe and hose that connect the pumps 180 to the top drive 140. In an embodiment, the rig standpipe includes a sensor to measure surface standpipe pressure. Mud motor differential pressure (DP) may be calculated, detected, or otherwise determined at the surface by calculating the difference between the surface standpipe pressure just off-bottom and pressure once the bit touches bottom and starts drilling and experiencing torque. Standpipe pressure sensor 161 may be coupled or otherwise associated with the top drive system 140.

The downhole MWD or wireline conveyed instruments may be configured for the evaluation of physical properties such as pressure, temperature, torque, WOB, RPM, vibration, inclination, azimuth, toolface orientation in three-dimensional space, and/or other downhole parameters. These measurements may be made downhole, stored in solid-state memory for some time, and downloaded from the instrument(s) at the surface and/or transmitted to the surface. Data transmission methods may include, for example, digitally encoding data and transmitting the encoded data to the surface, possibly as pressure pulses in the drilling fluid or mud system, acoustic transmission through the tubular string 155, electronically transmitted through a wireline or wired pipe, and/or transmitted as electromagnetic pulses. MWD tools and/or other portions of the BHA 170 may have the ability to store measurements for later retrieval via wireline and/or when the BHA 170 is tripped out of the wellbore 160.

In an exemplary embodiment, the apparatus 100 may also include a rotating blow-out preventer (BOP) 158, such as if the well 160 is being drilled utilizing under-balanced or managed-pressure drilling methods. In such embodiment, the annulus mud and cuttings may be pressurized at the surface, with the actual desired flow and pressure possibly being controlled by a choke system, and the fluid and pressure being retained at the well head and directed down the flow line to the choke by the rotating BOP 158. The apparatus 100 may also include a surface casing annular pressure sensor 159 configured to detect the pressure in the annulus defined between, for example, the wellbore 160 (or casing therein) and the tubular string 155.

In the exemplary embodiment depicted in FIG. 1, the top drive 140 is utilized to impart rotary motion to the tubular string 155. However, aspects of the present disclosure are also applicable or readily adaptable to implementations utilizing other drive systems, such as a power swivel, a rotary table, a coiled tubing unit, a downhole motor, and/or a conventional rotary rig, among others.

The apparatus 100 also includes a controller 190 configured to control or assist in the control of one or more components of the apparatus 100. For example, the controller 190 may be configured to transmit operational control signals to the drawworks 130, the top drive 140, the BHA 170 and/or the pump 180. The controller 190 may be a stand-alone component installed near the mast 105 and/or other components of the apparatus 100. In an exemplary embodiment, the controller 190 includes one or more systems located in a control room proximate the apparatus 100, such as the general purpose shelter often referred to as the "doghouse" serving as a combination tool shed, office, communications center and general meeting place. The controller 190 may be configured to transmit the operational control signals to the drawworks 130, the top drive 140, the BHA 170 and/or the pump 180 via wired or wireless transmission means which, for the sake of clarity, are not depicted in FIG. 1.

The controller 190 is also configured to receive electronic signals via wired or wireless transmission means (also not shown in FIG. 1) from a variety of sensors included in the apparatus 100, where each sensor is configured to detect an operational characteristic or parameter. Examples of sensors include the speed sensors 140b and 170e, torque sensor 172b, pressure sensor 170a, and the WOB sensor 140c described below. In various embodiments, wired/networked drill string sensor data is used to obtain sensor readings for WOB, torque on bit (TOB), or other needed data.

The word "detecting," as used in the context of the present disclosure, may include detecting, sensing, measuring, calculating, and/or otherwise obtaining data. Similarly, the word "detect" in the context of the present disclosure may include detect, sense, measure, calculate, and/or otherwise obtain data.

The apparatus 100 may include a downhole annular pressure sensor 170a coupled to or otherwise associated with the BHA 170. The downhole annular pressure sensor 170a may be configured to detect a pressure value or range in the annulus-shaped region defined between the external surface of the BHA 170 and the internal diameter of the wellbore 160, which may also be referred to as the downhole pressure, casing pressure, downhole casing pressure, MWD casing pressure, or downhole annular pressure.

The apparatus 100 may additionally or alternatively include a shock/vibration sensor 170b that is configured for detecting shock and/or vibration in the BHA 170.

The apparatus 100 may additionally or alternatively include a mud motor DP sensor 172a that is configured to detect a pressure differential value or range across one or more motors 172 of the BHA 170. The one or more motors 172 may each be or include a positive displacement drilling motor that uses hydraulic power of the drilling fluid to drive the bit 175, also known as a mud motor. One or more torque sensors 172b may also be included in the BHA 170 for sending data to the controller 190 that is indicative of the torque applied to the bit 175 or TOB by the one or more motors 172.

The apparatus 100 may additionally or alternatively include any available toolface sensor 170c configured to detect the current toolface orientation. The toolface sensor 170c may be or include a conventional or future-developed "magnetic toolface," which detects toolface orientation relative to magnetic north or true north. Alternatively, or additionally, the toolface sensor 170c may be or include a conventional or future-developed "gravity toolface," which detects toolface orientation relative to the Earth's gravitational field. The toolface sensor 170c may also, or alternatively, be or include a conventional or future-developed gyro sensor.

The apparatus 100 may additionally or alternatively include a WOB sensor 170d integral to the BHA 170 and configured to detect WOB at or near the BHA 170.

The apparatus 100 may additionally or alternatively include a speed sensor 170e configured to detect rotational speed of the drill string at or near the BHA 170. In one embodiment, speed sensor 170e includes a magnetometer. Using the earth's magnetic field as a reference, the magnetometer can measure how fast the BHA is rotating, and the RPM of the BHA can then be calculated.

The apparatus 100 may additionally or alternatively include a torque sensor 140a coupled to or otherwise associated with the top drive 140. The torque sensor 140a may alternatively be located in or associated with the BHA 170. The torque sensor 140a may be configured to detect a value or range of the torsion of the quill 145 and/or the tubular string 155 (e.g., in response to operational forces acting on the tubular string). The top drive 140 may additionally or alternatively include or otherwise be associated with a speed sensor 140b configured to detect a value or range of the rotational speed of the quill 145.

The top drive 140, drawworks 130, crown or traveling block, drilling line or dead line anchor may additionally or alternatively include or otherwise be associated with a WOB sensor 140c (e.g., one or more sensors installed somewhere in the load path mechanisms to detect WOB, which can vary from rig-to-rig different from the WOB sensor 170d. The WOB sensor 140c may be configured to detect a WOB value or range, where such detection may be performed at the top drive 140, drawworks 130, or other component of the apparatus 100. In some embodiments, the drawworks 130 contributes to a combined downward force applied to the drill bit 175, or the WOB. That is, the drawworks 130 may provide increasing lengths of drilling line 125 to the crown block 115 and the traveling block 120, increasing the WOB available for cutting forcefully into the formation.

An autodriller may be present on the apparatus 100 for controlling the drawworks 130 in response to the monitored performance of the apparatus 100. That is, when the performance of the apparatus 100 falls below a certain desired performance threshold, the autodriller may utilize a processor and programming to automatically control the drawworks 130 to increase WOB in order to increase the performance.

The detection performed by the sensors described herein may be performed once, continuously, periodically, and/or at random intervals. The detection may be manually triggered by an operator or other person accessing a human-machine interface (HMI), or automatically triggered by, for example, a triggering characteristic or parameter satisfying a predetermined condition (e.g., expiration of a time period, drilling progress reaching a predetermined depth, drill bit usage reaching a predetermined amount, etc.). Such sensors and/or other detection means may include one or more interfaces which may be local at the well/rig site or located at another, remote location with a network link to the system.

FIG. 1 shows an exemplary deviation of the wellbore 160 from a straight path achieved by directional drilling. To properly steer the mud motor 175, an operator terminates rotation of the tubular string 155 and typically determines the toolface orientation, for example, by monitoring data from downhole MWD sensors. The operator then rotates the tubular string 155 through a certain angle to achieve the toolface orientation for the new drilling direction. As the tubular string 155 is held still, the mud motor 175 proceeds at the angle from the end of the tubular string 155. Thus, the wellbore 160 can advance along a curved path. A straight path can again be drilled by resuming continuous rotation of the tubular string 155.

Figure 2:
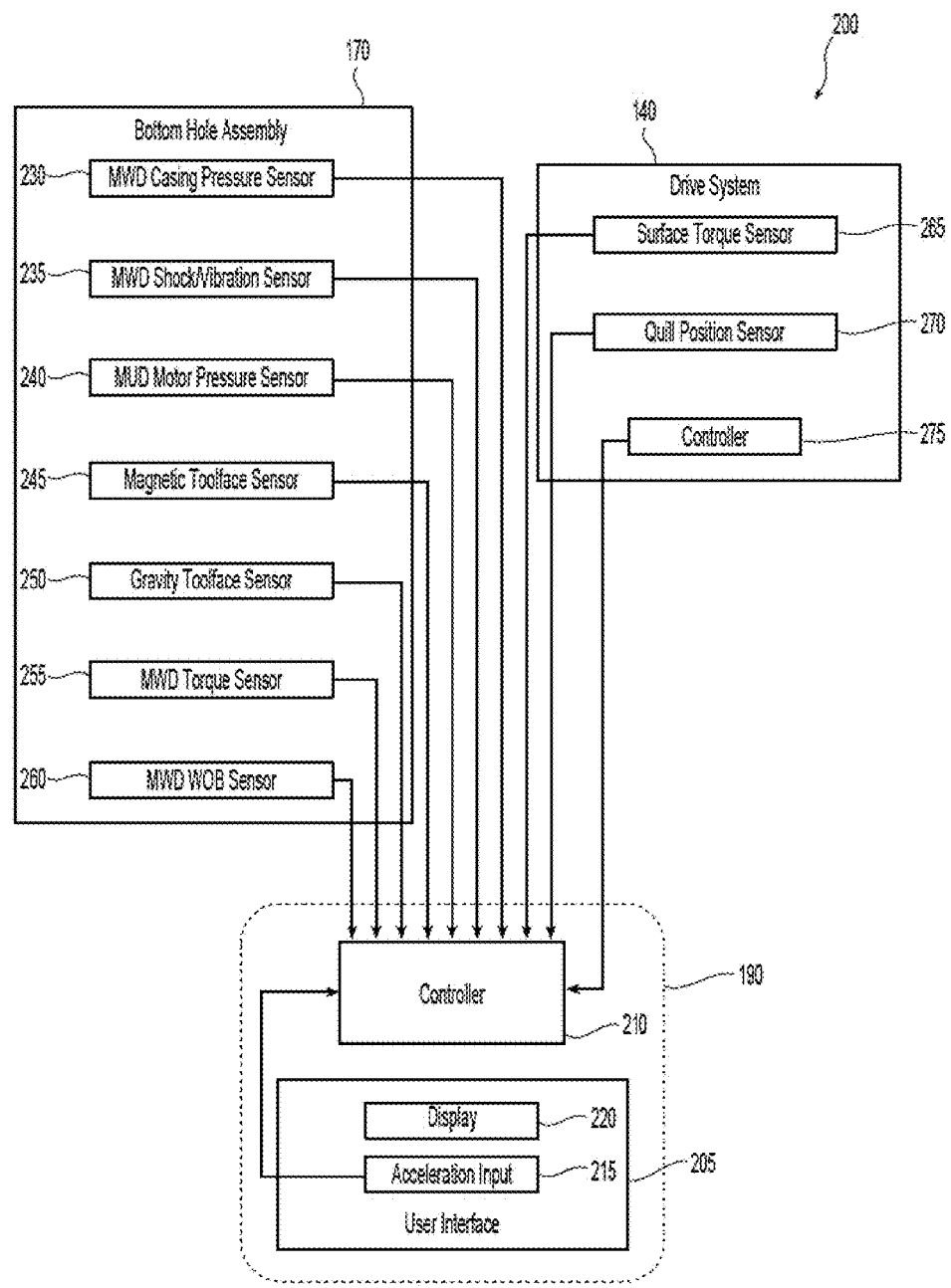
FIG. 2 is a block diagram of an apparatus shown as an exemplary control system according to one or more aspects of the present disclosure.

FIG. 2 illustrates a block diagram of a portion of an apparatus 200 according to one or more aspects of the present disclosure. FIG. 2 shows the control system 190, the BHA 170, and the top drive or drive system 140. The apparatus 200 may be implemented within the environment and/or the apparatus shown in FIG. 1.

The control system 190 includes a user-interface 205 and a controller 210. Depending on the embodiment, these may be discrete components that are interconnected via wired or wireless means. Alternatively, the user-interface 205 and the controller 210 may be integral components of a single system.

The user-interface 205 includes an input mechanism 215 for user-input of one or more drilling settings or parameters, such as acceleration, top drive RPM set points, desired toolface orientation, toolface set points, toolface setting limits, rotation settings (e.g., RPM at the top drive) and other set points or input data. Further, a user may input information relating to the drilling parameters of the drill string 155, such as BHA 170 information or arrangement, drill pipe size, bit type, depth, formation information, and drill pipe material, among other things. These drilling parameters are useful, for example, in determining a composition of the drill string 155 to reduce forward whirl.

The input mechanism 215 may include a keypad, voice-recognition apparatus, dial, button, switch, slide selector, toggle, joystick, mouse, data base and/or other conventional or future-developed data input device. Such an input mechanism 215 may support data input from local and/or remote locations. Alternatively, or additionally, the input mechanism 215 may permit user-selection of predetermined profiles, algorithms, set point values or ranges, such as via one or more drop-down menus. The data may also or alternatively be selected by the controller 210 via the execution of one or more database look-up procedures. In general, the input mechanism 215 and/or other components within the scope of the present disclosure support operation and/or monitoring from stations on the rig site as well as one or more remote locations with a communications link to the system, network, local area network (LAN), wide area network (WAN), Internet, satellite-link, and/or radio, among other means.

The user-interface 205 may also include a display 220 for visually presenting information to the user in textual, graphic, or video form. The display 220 may also be utilized by the user to input drilling parameters, limits, or set point data in conjunction with the input mechanism 215. For example, the input mechanism 215 may be integral to or otherwise communicably coupled with the display 220.

The BHA 170 may include one or more sensors, typically a plurality of sensors, located and configured about the BHA to detect parameters relating to the drilling environment, the BHA condition and orientation, and other information. In the embodiment shown in FIG. 2, the BHA 170 includes an optional MWD casing pressure sensor 230 that is configured to detect an annular pressure value or range at or near the MWD portion of the BHA 170. The casing pressure data detected via the MWD casing pressure sensor 230 may be sent via electronic signal to the controller 210 via wired or wireless transmission.

The BHA 170 may also include an MWD shock/vibration sensor 235 that is configured to detect shock and/or vibration in the MWD portion of the BHA 170. The shock/vibration data detected via the MWD shock/vibration sensor 235 may be sent via electronic signal to the controller 210 via wired or wireless transmission.

The BHA 170 may also include a mud motor ΔP sensor 240 that is configured to detect a pressure differential value or range across the mud motor of the BHA 170. The pressure differential data detected via the mud motor ΔP sensor 240 may be sent via electronic signal to the controller 210 via wired or wireless transmission. The mud motor ΔP may be alternatively or additionally calculated, detected, or otherwise determined at the surface, such as by calculating the difference between the surface standpipe pressure just off-bottom and pressure once the bit touches bottom and starts drilling and experiencing torque.

The BHA 170 may also include a magnetic toolface sensor 245 and a gravity toolface sensor 250 that are cooperatively configured to detect the current toolface. The magnetic toolface sensor 245 may be or include a conventional or future-developed magnetic toolface sensor which detects toolface orientation relative to magnetic north or true north. The gravity toolface sensor 250 may be or include a conventional or future-developed gravity toolface sensor that detects toolface orientation relative to the Earth's gravitational field. In an exemplary embodiment, the magnetic toolface sensor 245 may detect the current toolface when the end of the wellbore is less than about 7° from vertical, and the gravity toolface sensor 250 may detect the current toolface when the end of the wellbore is greater than about 7° from vertical. However, other toolface sensors may also be utilized within the scope of the present disclosure that may be more or less precise or have the same degree of precision, including non-magnetic toolface sensors and non-gravitational inclination sensors. In any case, the toolface orientation detected via the one or more toolface sensors (e.g., sensors 245 and/or 250) may be sent via electronic signal to the controller 210 via wired or wireless transmission.

The BHA 170 may also include an MWD torque sensor 255 that is configured to detect a value or range of values for torque applied to the bit by the motor(s) of the BHA 170. The torque data detected via the MWD torque sensor 255 may be sent via electronic signal to the controller 210 via wired or wireless transmission.

The BHA 170 may also include an MWD weight-on-bit (WOB) sensor 260 that is configured to detect a value or range of values for WOB at or near the BHA 170. The WOB data detected via the MWD WOB sensor 260 may be sent via electronic signal to the controller 210 via wired or wireless transmission.

The top drive 140 includes a surface torque sensor 265 that is configured to detect a value or range of the reactive torsion of the quill 145 or drill string 155. The torque sensor can also be utilized to detect the torsional resonant frequency of the drill string by applying a Fast Fourier Transform (FFT) on the torque signal while rotary drilling. The top drive 140 also includes a quill position sensor 270 that is configured to detect a value or range of the rotational position of the quill, such as relative to true north or another stationary reference. The surface torsion and quill position data detected via sensors 265 and 270, respectively, may be sent via electronic signal to the controller 210 via wired or wireless transmission. In FIG. 2, the top drive 140 also is associated with a controller 275 and/or other means for controlling the rotational position, speed and direction of the quill 145 or other drill string component coupled to the top drive 140 (such as the quill 145 shown in FIG. 1). Depending on the embodiment, the controller 275 may be integral with or may form a part of the controller 210.

The controller 210 is configured to receive detected information (i.e., measured or calculated) from the user-interface 205, the BHA 170, and/or the top drive 140, and utilize such information to continuously, periodically, or otherwise operate to determine an operating parameter having improved effectiveness. The controller 210 may be further configured to generate a control signal, such as via intelligent adaptive control, and provide the control signal to the top drive 140 to adjust and/or maintain the BHA orientation.

Moreover, as in the exemplary embodiment depicted in FIG. 2, the controller 275 of the top drive 140 may be configured to generate and transmit a signal to the controller 210. Consequently, the controller 275 of the top drive 140 may be configured to influence the control of the BHA 170 to assist in mitigating or avoiding whirl conditions. Such cooperation may be independent of control provided to or from the controller 210 and/or the BHA 170.

Figure 3:
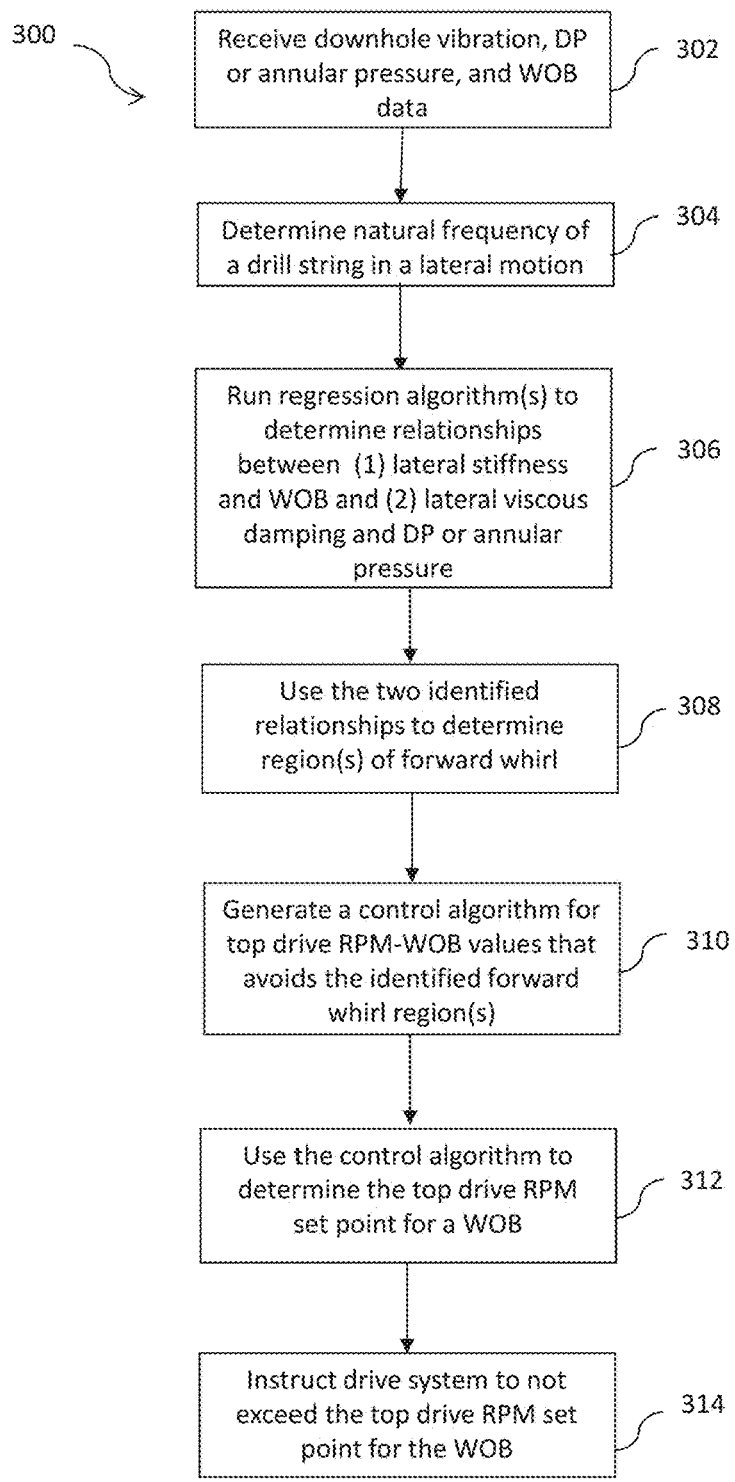
FIG. 3 is an exemplary flow chart showing an exemplary process of reducing forward whirl according to one or more aspects of the present disclosure.

FIG. 3 is a flow chart showing an exemplary method 300 of reducing forward whirl according to aspects of the present disclosure. Reducing forward whirl helps to reduce backward whirl. By reducing whirl, more resultant ROP and less damage to downhole tools and the drilling bit are achieved. Thus, less tripping and more drilling occurs. The method 300 may be performed, for example, with respect to the controller 190 and the apparatus 100 components discussed above with respect to FIG. 1. It is understood that additional steps can be provided before, during, and after the steps of method 300.

At block 302, the controller 190 receives the following data from downhole sensors: vibration (e.g., motion along the x and y axes), annular pressure or DP, and WOB. For example, the controller 190 receives vibration data from shock/vibration sensor 170b, the DP from mud motor DP sensor 172a, annular pressure from annular pressure sensor 170a, and the WOB from WOB sensor 170d. In some embodiments, WOB is estimated using DP or drilling torque.

At block 304, the controller 190 determines the natural frequency of the drill string in the lateral motion. In one embodiment, the controller 190 performs a FFT on the received vibration data to find the natural frequency of the drill string. For example, when there is a spike in the power density (or the power density exceeds a threshold value), the corresponding frequency for the spike is the natural frequency. Natural frequency may be calculated based on lateral stiffness and mass of the drill string if both are known, or for example lateral stiffness may be calculated based on mass and natural frequency of the drill string At block 306, the controller 190 is triggered to run regression algorithms to determine the relationships between (1) lateral stiffness (k) and WOB and (2) lateral viscous damping (β) and DP or annular pressure. In several embodiments, both linear and non-linear regression algorithms are run.

Regression analysis is typically used for prediction and forecasting. For example, it is used to estimate the relationships among variables, and includes many techniques for modeling and analyzing several variables. Regression analysis helps determine how the value of a variable changes when another variable is varied. In the present case, the effect of WOB on k and the effect of DP or annular pressure on β is determined.

In several embodiments, the controller 190 receives WOB data from WOB sensor 170*d*, and then calculates the corresponding lateral stiffness. In one embodiment, lateral stiffness is calculated using the equation:

$$\omega = \sqrt{\frac{k}{m}}$$

where:
ω is the natural frequency determined at block 304,
m is the BHA mass, and
k is the lateral stiffness.

Once there are several WOB-lateral stiffness values generated, the controller 190 runs regression algorithms. In one embodiment, a linear regression analysis is performed, and an equation (e.g., y=mx+b) relating WOB and k is formulated. In other embodiments, a non-linear regression analysis is performed to formulate an equation (e.g., y=mx²+nx+b) relating WOB and k.

In various embodiments, the controller 190 receives DP data from mud motor DP sensor 172*a* or annular pressure data from annular pressure sensor 170*a* and calculates corresponding values of β. The values for β may be estimated from measured values of vibration when the bit just starts rotating off bottom and using logarithmic decrement formula. For example:

$$\zeta(\text{damping ratio}) = \frac{\beta}{2\sqrt{km}}$$

where:
N is the number of cycles in the data captured when off bottom rotation is just started,
$X_1$ is the amplitude of x-y vibrations at the start of rotating the bit off bottom, and
$X_{N+1}$ is the amplitude of a successive x-y vibrations after a couple of cycles of off-bottom rotation.
The BHA mass m is known from drill string mechanical properties inputted by an operator (e.g., using pipe tally information and BHA composition). As discussed above, lateral stiffness may be calculated based on the mass and natural frequency of the drill string.

Thus, measured vibration data can be substituted into Equation 3 to calculate values for δ. Values for δ can then be substituted into Equation 2 to calculate values of ζ, and values of ζ can be substituted into Equation 1 to calculate values for β.

Similar to the description for finding the relationship between WOB and k, once there are several DP or annular pressure-β values generated, the controller 190 runs regression algorithms (e.g., linear and/or non-linear) to determine the relationship between DP or annular pressure and β.

At block 308, the controller 190 uses the two identified relationships and the equation
where:
|X| is the amplitude of lateral oscillations, $$r = \frac{\Omega}{\omega},$$

$$\zeta = \frac{\beta}{2\sqrt{km}},$$

$$\omega = \sqrt{\frac{k}{m}},$$

and Ω is the bit RPM
to identify and model region(s) of forward whirl. For example, real-time drilling data of WOB and DP or annular pressure are used to calculate k and β. Measured values of WOB are input into the equation relating WOB to k to calculate k values that can be plugged into equation 4. Measured values of DP or annular pressure are input into the equation relating pressure and β to calculate β values that can be plugged into equation 4.

In several embodiments, the inequality of |X|>maximum threshold of lateral motion (which can be determined experimentally, or it could be based on hole diameter and pipe diameter) is used to determine the region(s) of forward whirl. For example, |X|=hole radius−pipe radius. In several embodiments, the values of WOB and top drive RPM that make this inequality true are used to generate a two dimensional graph of WOB versus top drive RPM to determine regions of forward whirl. That is, what top drive RPM-WOB values resulting in forward whirl can be graphed or plotted.

Figure 4:
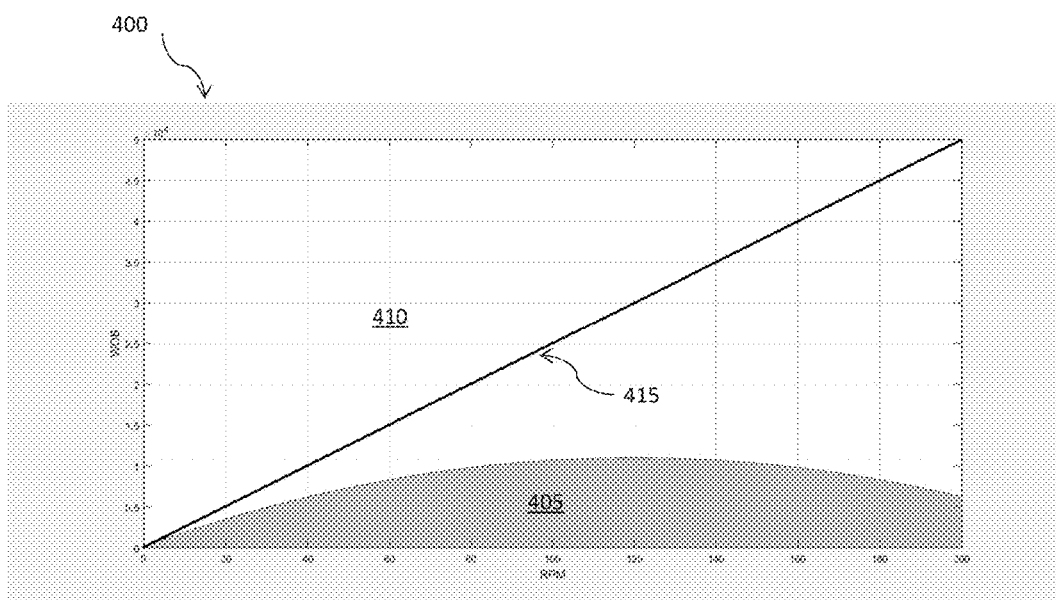
FIG. 4 is an exemplary graph showing a forward whirl region according to one or more aspects of the present disclosure.

FIG. 4 illustrates an exemplary plot 400 of the inequality, which shows the forward whirl region 405 for a particular drilling operation. As shown in FIG. 4, the forward whirl region 405 encompasses certain top drive RPMs and WOBs. Region 410 is the "safe" region where forward whirl conditions do not exist. The more WOB is sensed, the more RPM can be applied until a desired WOB and RPM is reached that minimizes of preferably avoids forward whirl (e.g., following the contour lines away from the forward whirl region). In several embodiments, the model or plot is updated every time there is a relevant change in the lateral dynamics.

At block 310, the controller 190 generates a control algorithm or equation for top drive RPM-WOB values that avoids the identified forward-whirl region(s). In various embodiments, the control algorithm corresponds to a line or curve that is just above the forward whirl region(s). In FIG. 4, line 415 corresponds to the control algorithm. In some embodiments, the controller 190 schedules the top drive RPM-WOB relationship around regions of severe forward whirl.

At block 312, the controller 190 uses the control algorithm generated at block 310 to determine the top drive RPM supervisory set point for a specific WOB sensed. That is, a maximum top drive RPM to be used with a particular WOB is determined so that forward whirl conditions are avoided. For example, when a WOB at a certain point in time is communicated to the controller 190, the controller 190 inputs the WOB into the control algorithm to output the maximum top drive RPM that can be used with that WOB.

At block 314, the controller 190 instructs the drive system 140 to not exceed the top drive RPM set point at that particular WOB to reduce or eliminate instances of forward whirl. In certain embodiments, the controller 190 detects that the WOB is greater than the WOB set point, and instructs the drive system 140 to adjust the top drive RPM to a lesser value. In other embodiments, controller 190 detects that the top drive RPM is less than the RPM set point, and instructs the drive system 140 to adjust the RPM to a greater value.

Figure 5:
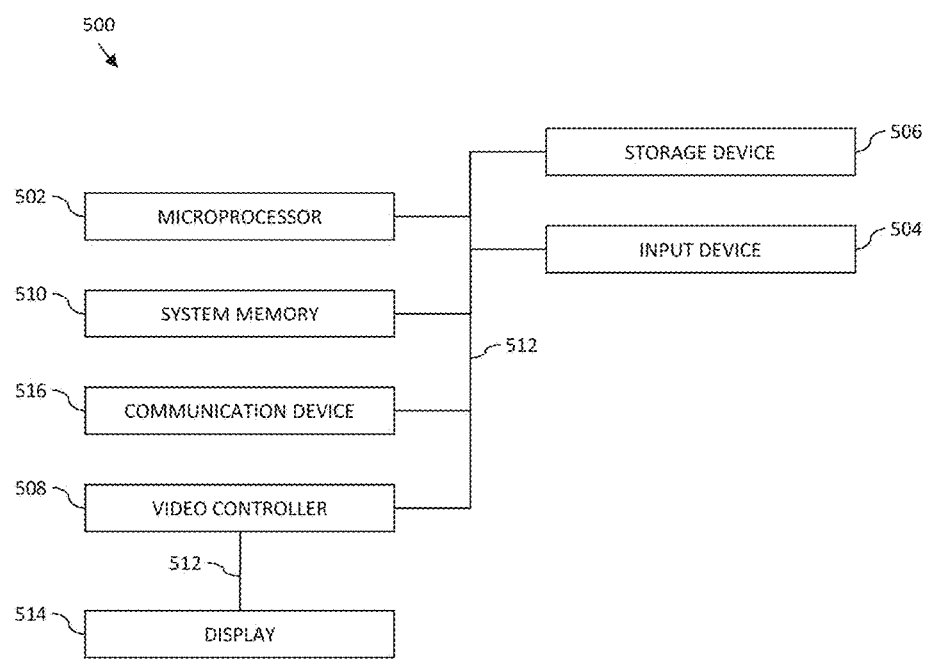
FIG. 5 is a diagram of an exemplary system for implementing one or more embodiments of the described apparatuses, systems, or methods according to one or more aspects of the present disclosure.

Referring now to FIG. 5, illustrated is an exemplary system 500 for implementing one or more embodiments of at least portions of the apparatuses and/or methods described herein. The system 500 includes a processor 502, an input device 504, a storage device 506, a video controller 508, a system memory 510, a display 514, and a communication device 516, all interconnected by one or more buses 512. The storage device 506 may be a floppy drive, hard drive, CD, DVD, optical drive, or any other form of storage device. In addition, the storage device 506 may be capable of receiving a floppy disk, CD, DVD, or any other form of computer-readable medium that may contain computer-executable instructions. Communication device 516 may be a modem, network card, wireless router, or any other device to enable the system 500 to communicate with other systems.

A computer system typically includes at least hardware capable of executing machine readable instructions, as well as software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, PDAs, and personal computing devices (PCDs), for example). Furthermore, hardware typically includes any physical device that is capable of storing machine-readable instructions, such as memory or other data storage devices. Other forms of hardware include hardware sub-systems, including transfer devices such as modems, modem cards, ports, and port cards, for example. Hardware may also include, at least within the scope of the present disclosure, multi-modal technology, such as those devices and/or systems configured to allow users to utilize multiple forms of input and output—including voice, keypads, and stylus—interchangeably in the same interaction, application, or interface.

Software may include any machine code stored in any memory medium, such as RAM or ROM, machine code stored on other devices (such as floppy disks, CDs or DVDs, for example), and may include executable code, an operating system, as well as source or object code, for example. In addition, software may encompass any set of instructions capable of being executed in a client machine or server—and, in this form, is often called a program or executable code.

Hybrids (combinations of software and hardware) are becoming more common as devices for providing enhanced functionality and performance to computer systems. A hybrid may be created when what are traditionally software functions are directly manufactured into a silicon chip—this is possible since software may be assembled and compiled into ones and zeros, and, similarly, ones and zeros can be represented directly in silicon. Typically, the hybrid (manufactured hardware) functions are designed to operate seamlessly with software. Accordingly, it should be understood that hybrids and other combinations of hardware and software are also included within the definition of a computer system herein, and are thus envisioned by the present disclosure as possible equivalent structures and equivalent methods.

Computer-readable mediums may include passive data storage such as a random access memory (RAM), as well as semi-permanent data storage such as a compact disk or DVD. In addition, an embodiment of the present disclosure may be embodied in the RAM of a computer and effectively transform a standard computer into a new specific computing machine.

Data structures are defined organizations of data that may enable an embodiment of the present disclosure. For example, a data structure may provide an organization of data or an organization of executable code (executable software). Furthermore, data signals are carried across transmission mediums and store and transport various data structures, and, thus, may be used to transport an embodiment of the invention. It should be noted in the discussion herein that acts with like names may be performed in like manners, unless otherwise stated.

The controllers and/or systems of the present disclosure may be designed to work on any specific architecture. For example, the controllers and/or systems may be executed on one or more computers, Ethernet networks, local area networks, wide area networks, internets, intranets, hand-held and other portable and wireless devices and networks.

In view of all of the above and the figures, one of ordinary skill in the art will readily recognize that the present disclosure relates to systems and methods for reducing or eliminating whirl. In one aspect, the present disclosure is directed to a system that includes a controller and a drive system. The controller is configured to collect lateral downhole vibration, weight on bit (WOB), and differential pressure (DP) or annular pressure data; determine a natural frequency of a drill string in a lateral motion, determine a correlative relationship between: (1) lateral stiffness (k) and WOB, and (2) lateral viscous damping ($\beta$) and DP or annular pressure, model a forward whirl region using the determined relationships for (1) and (2), generate a control algorithm for top drive RPM and WOB that avoids the forward whirl region, determine a top drive RPM supervisory set point for a particular WOB using the control algorithm, and provide one or more operational control signals that limit the top drive RPM to the top drive RPM supervisory set point for the particular WOB. The drive system is configured to receive the one or more operational control signals from the controller, and limit the top drive RPM so that the top drive RPM does not exceed the top drive supervisory set point for the particular WOB.

In a second aspect, the present disclosure is directed to a method of reducing forward whirl in a drill bit. The method includes determining, by a controller, relationships for: (1) lateral stiffness (k) and weight on bit (WOB), and (2) lateral viscous damping ($\beta$) and differential pressure (DP) or annular pressure, generating, by the controller, a graph of a forward whirl region using an equation:

wherein:

|X| is an amplitude of lateral oscillations, $$r = \frac{\Omega}{\omega},$$

$$\zeta = \frac{\beta}{2\sqrt{km}},$$

$$\omega = \sqrt{\frac{k}{m}},$$

and

Ω is a bit RPM the determined relationships for (1) and (2), and an inequality:

|X|>a maximum threshold of lateral motion, generating, by the controller, a control algorithm that avoids the forward whirl region; determining, by the controller, a top drive RPM supervisory set point for a particular WOB using the control algorithm; and instructing a drive system to limit a top drive RPM to the top drive RPM supervisory set point for the particular WOB.

In a third aspect, the present disclosure is directed to a non-transitory machine-readable medium having stored thereon machine-readable instructions executable to cause a machine to perform operations. The operations include determining, using regression analysis, relationships for: (1) lateral stiffness (k) and weight on bit (WOB), and (2) lateral viscous damping (β) and differential pressure (DP) or annular pressure, modeling a forward whirl region using the determined relationships for (1) and (2) and an equation:

wherein:

|X| is an amplitude of lateral oscillations, $$r = \frac{\Omega}{\omega},$$

$$\zeta = \frac{\beta}{2\sqrt{km}},$$

$$\omega = \sqrt{\frac{k}{m}},$$

and

Ω is the bit RPM generating a control algorithm that avoids the forward whirl region; limiting a top drive RPM supervisory set point for a particular WOB using the control algorithm, detecting that a top drive RPM at the particular WOB is less than or greater than the top drive RPM supervisory set point, and instructing a drive system to increase or decrease the top drive RPM at the particular WOB.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. § 112(f) for any limitations of any of the claims herein, except for those in which the claim expressly uses the word "means" together with an associated function.

What is claimed is:

1. A system, comprising:
    a controller configured to:
        collect downhole lateral vibration, weight on bit (WOB), and differential pressure (DP) or annular pressure data,
        determine a natural frequency of a drill string in a lateral motion;
        determine a correlative relationship between:
            (1) lateral stiffness (k) and WOB, and
            (2) lateral viscous damping (β) and DP or annular pressure,
        model a forward whirl region using the determined relationships for (1) and (2),
        generate a control algorithm for top drive RPM and WOB that avoids the forward whirl region,
        determine a top drive RPM supervisory set point for a particular WOB using the control algorithm, and
        provide one or more operational control signals that limit the top drive RPM to the top drive RPM supervisory set point for the particular WOB; and
    a drive system configured to:
        receive the one or more operational control signals from the controller, and
        limit the top drive RPM so that the top drive RPM does not exceed the top drive supervisory set point for the particular WOB.

2. The system of claim 1, wherein determining the correlative relationships between (1) and (2) comprises running linear regression algorithms, non-linear regression algorithms, or both.

3. The system of claim 1, wherein determining the correlative relationship between (1) comprises using an equation:

$$\omega = \sqrt{\frac{k}{m}}$$

wherein:
    ω is the natural frequency of the well,
    m is a mass of a bottom hole assembly (BHA), and
    k is the lateral stiffness.

4. The system of claim 1, wherein determining the correlative relationship between (2) comprises using an equation:

$$\zeta = \frac{\beta}{2\sqrt{km}}$$

wherein:
    ζ is a damping ratio,
    β is the lateral viscous damping,
    k is the lateral stiffness, and
    m is a mass of the BHA.

5. The system of claim 1, wherein the controller is further configured to calculate the lateral stiffness (k) and mass of a BHA based on operator input.

6. The system of claim 1, wherein modeling the forward whirl region using the determined relationships for (1) and (2) comprises substituting the determined relationships for (1) and (2) in an equation:
wherein:
|X| is an amplitude of lateral oscillations, $$r = \frac{\Omega}{\omega},$$

$$\zeta = \frac{\beta}{2\sqrt{km}},$$

$$\omega = \sqrt{\frac{k}{m}},$$

and
$\Omega$ is a bit RPM.

7. The system of claim 6, further comprising determining a maximum threshold of the lateral motion based on hole diameter and pipe or collar diameter.

8. The system of claim 7, wherein the controller is further configured to generate a graph of an inequality:

|X|>the maximum threshold of lateral motion to show the forward whirl region and display the graph to a user.

9. The system of claim 8, wherein the graph comprises a two-dimensional plot of WOB versus top drive RPM.

10. The system of claim 1, wherein the control algorithm corresponds to a line or curve that is above the forward whirl region.

11. A method of reducing forward whirl in a drill bit, which comprises:
determining, by a controller, relationships for:
(1) lateral stiffness (k) and weight on bit (WOB), and
(2) lateral viscous damping ($\beta$) and differential pressure (DP) or annular pressure,
generating, by the controller, a graph of a forward whirl region using an equation:
wherein:
|X| is an amplitude of lateral oscillations, $$r = \frac{\Omega}{\omega},$$

$$\zeta = \frac{\beta}{2\sqrt{km}},$$

$$\omega = \sqrt{\frac{k}{m}},$$

and
$\Omega$ is a bit RPM
the determined relationships for (1) and (2), and an inequality:

|X|>a maximum threshold of lateral motion, generating, by the controller, a control algorithm that avoids the forward whirl region;
determining, by the controller, a top drive RPM supervisory set point for a particular WOB using the control algorithm; and
instructing a drive system to limit a top drive RPM to the top drive RPM supervisory set point for the particular WOB.

12. The method of claim 11, wherein determining the relationships for (1) and (2) comprises running linear regression algorithms, non-linear regression algorithms, or both.

13. The method of claim 11, further comprising determining a natural frequency of a drill string in a lateral motion.

14. The method of claim 13, wherein determining the relationship for (1) comprises using an equation:

$$\omega = \sqrt{\frac{k}{m}}$$

wherein:
$\omega$ is the natural frequency of the well,
m is a mass of a bottom hole assembly (BHA), and
k is the lateral stiffness.

15. The method of claim 11, wherein determining the relationship for (2) comprises using an equation:

$$\zeta = \frac{\beta}{2\sqrt{km}}$$

wherein:
$\zeta$ is a damping ratio,
$\beta$ is the lateral viscous damping,
k is the lateral stiffness, and
m is a mass of the BHA.

16. The method of claim 11, wherein the graph comprises a two-dimensional plot of WOB versus top drive RPM.

17. A non-transitory machine-readable medium having stored thereon machine-readable instructions executable to cause a machine to perform operations that, when executed, comprise:
determining, using regression analysis, relationships for:
(1) lateral stiffness (k) and weight on bit (WOB), and
(2) lateral viscous damping ($\beta$) and differential pressure (DP) or annular pressure,
modeling a forward whirl region using the determined relationships for (1) and (2) and an equation:
wherein:
|X| is an amplitude of lateral oscillations, $$r = \frac{\Omega}{\omega},$$

$$\zeta = \frac{\beta}{2\sqrt{km}},$$

$$\omega = \sqrt{\frac{k}{m}},$$

and
$\Omega$ is the bit RPM
generating a control algorithm that avoids the forward whirl region;
limiting a top drive RPM supervisory set point for a particular WOB using the control algorithm,
detecting that a top drive RPM at the particular WOB is less than or greater than the top drive RPM supervisory set point, and instructing a drive system to increase or decrease the top drive RPM at the particular WOB.

18. The non-transitory machine-readable medium of claim 17, wherein the operations further comprise performing a Fast Fourier Transform (FFT) on received vibration data to determine a natural frequency of a drill string in a lateral motion where drilling is to occur.

19. The non-transitory machine-readable medium of claim 17, wherein the operations further comprise generating a plot of an inequality:

$|X|>$ a maximum threshold of lateral motion to show the forward whirl region and displaying the plot to a user.

20. The non-transitory machine-readable medium of claim 19, wherein the plot comprises a two-dimensional plot of WOB versus top drive RPM.

\* \* \* \* \*